United States Patent
Yocam et al.

(10) Patent No.: US 10,171,976 B2
(45) Date of Patent: Jan. 1, 2019

(54) REMOTE LOCATION MONITORING OF OBJECTS WITH MOBILE DEVICES

(71) Applicant: T-Mobile USA, Inc., Bellevue, WA (US)

(72) Inventors: Eric W. Yocam, Sammamish, WA (US); Ahmad Arash Obaidi, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 69 days.

(21) Appl. No.: 15/085,856

(22) Filed: Mar. 30, 2016

(65) Prior Publication Data

US 2017/0289734 A1   Oct. 5, 2017

(51) Int. Cl.
*H04W 24/00* (2009.01)
*H04W 4/80* (2018.01)
*H04W 4/021* (2018.01)
*H04W 4/12* (2009.01)
*H04B 5/00* (2006.01)

(52) U.S. Cl.
CPC ............ *H04W 4/80* (2018.02); *H04B 5/0031* (2013.01); *H04W 4/021* (2013.01); *H04W 4/12* (2013.01)

(58) Field of Classification Search
CPC ... H04W 24/08; H04W 4/02; H04W 52/0241; H04W 52/0251; H04W 52/0261; H04W 24/00; H04W 40/24; H04W 4/00; H04W 4/04; H04W 84/18; H04W 4/06; H04W 64/00; H04L 12/28; H04L 1/08; H04L 29/08
See application file for complete search history.

(56) References Cited

U.S. PATENT DOCUMENTS

| | | | | |
|---|---|---|---|---|
| 2004/0183674 A1* | 9/2004 | Ruvarac | ............ | G08B 21/0266 340/539.13 |
| 2008/0186165 A1* | 8/2008 | Bertagna | ............ | G08B 21/0227 340/539.13 |
| 2013/0314210 A1* | 11/2013 | Schoner | ............. | G06K 7/10366 340/8.1 |
| 2014/0359035 A1* | 12/2014 | Wang | ..................... | H04L 51/06 709/206 |
| 2017/0111606 A1* | 4/2017 | Davis | ..................... | H04N 5/772 |

* cited by examiner

*Primary Examiner* — Quan M Hua
(74) *Attorney, Agent, or Firm* — Lee & Hayes, PLLC

(57) ABSTRACT

A remote location monitoring arrangement within a wireless communication network. The monitoring arrangement comprises a tracking device for securing to an object. The monitoring arrangement further comprises one or more sentinel devices arranged within at least one of (i) around a boundary area or (ii) within the boundary area, wherein the boundary area is an area in which a user wishes the object to remain. The monitoring arrangement also comprises a monitoring device in communication with at least one of (i) the one or more sentinel devices or (ii) the tracking device such that at least one of (i) at least one of the one or more sentinel devices or (ii) the tracking device alerts the monitoring device over the wireless communication network that (i) the tracking device has left the boundary area or (ii) another object has entered the boundary areas.

20 Claims, 4 Drawing Sheets

REMOTE LOCATION MONITORING OF OBJECTS WITH MOBILE DEVICES

BACKGROUND

In recent years, telecommunication devices have advanced from offering simple voice calling services within wireless networks to providing users with many new features. Telecommunication devices now provide messaging services such as email, text messaging, and instant messaging; data services such as Internet browsing; media services such as storing and playing a library of favorite songs; location services; and many others. Thus, telecommunication devices, referred to herein as mobile devices, are often used in multiple contexts. In addition to the new features provided by the telecommunication devices, users of such telecommunication devices have greatly increased. Such an increase in users is only expected to continue and in fact, it is expected that there could be a growth rate of twenty times more users in the next few years alone.

People often wish to keep track of various "objects" such as, for example, children, pets and portable electronic devices. Likewise, it can be desirable to keep track of "very important people" (VIPs) such as professional athletes, entertainers, politicians, etc. However, keeping track of such objects can be difficult and expensive.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
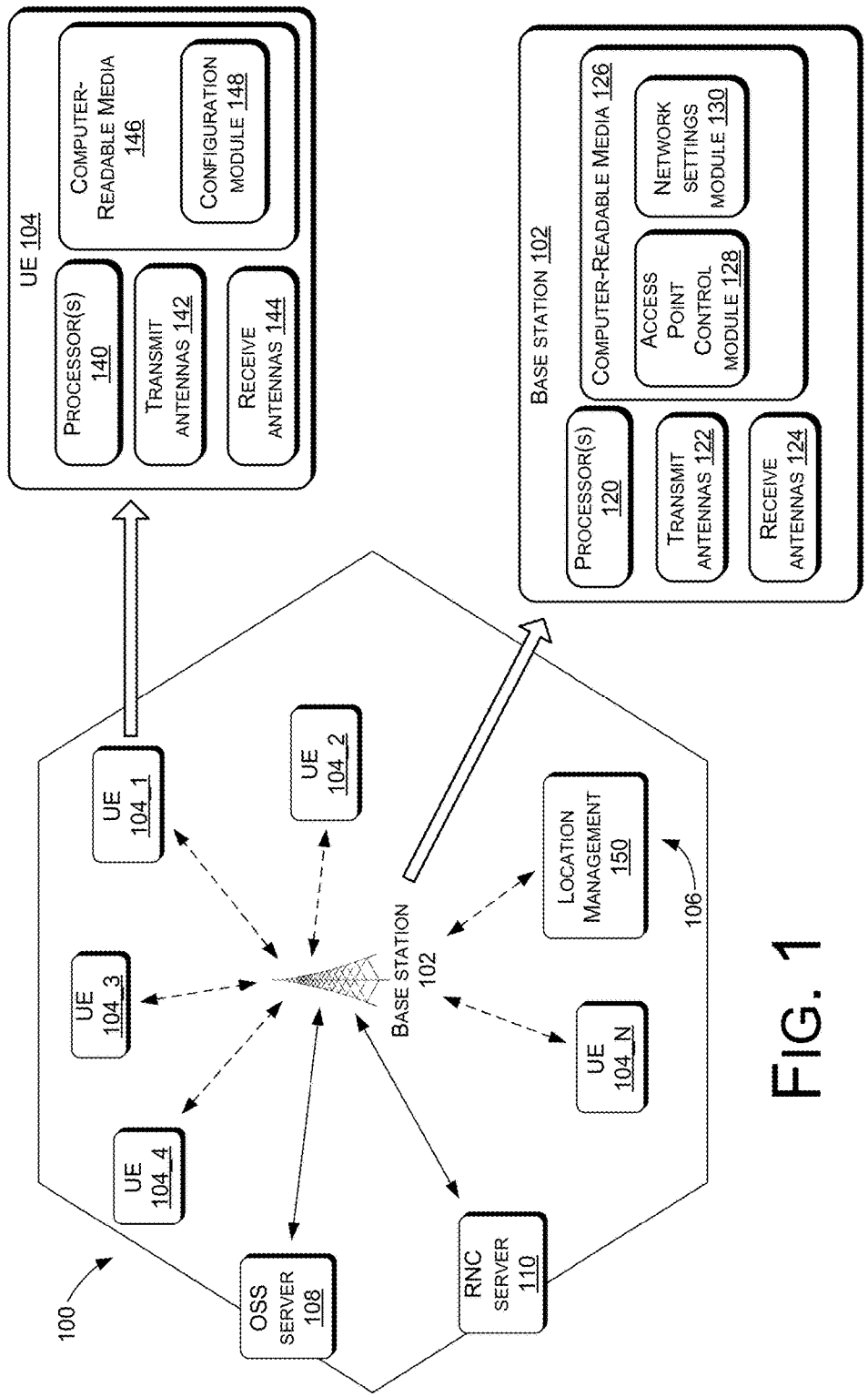
FIG. 1 illustrates a wireless communication network, in accordance with various embodiments.

Described herein is an architecture for a remote location management system or arrangement arranged within a wireless communication network. The remote location monitoring arrangement may include a tracking device that can be placed on an object that a user within the wireless communication network wishes to keep track of. In embodiments, the tracking device comprises a bracelet that can be placed around a person's wrist or ankle, if the object is a person. Likewise, the tracking device can comprise a collar or bracelet that can be placed around a pet's neck or ankle, if the object to be tracked is a pet. Other tracking devices can be used such as, for example, hats, rings, articles of clothing, watches, mobile devices, etc.

In an embodiment, the tracking device includes a transmitter that communicates with a monitoring device, such as, for example, a mobile device, of the user. The user can establish boundaries defining an area within which the user wishes for the object to remain. Boundaries can be marked with sentinel devices in the form of, for example, near field communication (NFC) devices, cameras, microphones, etc. For example, NFC devices can be placed around the boundaries or within the boundaries. The user can register the NFC devices such that the tracking device can interact and communicate with the NFC devices. If the tracking device loses communication with the NFC devices, then the tracking device can inform the user's mobile device, thereby alerting the user that the object has left the area. Likewise, the sentinels can be arranged and configured to notify the mobile device of the user if another object, such as a person or an animal, has entered the area.

In embodiments, the tracking device comprises and/or can communicate with Internet of Things (IoT) devices that can serve as monitoring devices. Generally, Internet of Things refers to a network of physical objects—devices, vehicles, buildings and other items embedded with electronics, software, sensors, and network connectivity—that enables these objects to collect and exchange data. IoT allows objects to be sensed and controlled remotely across existing network infrastructure, creating opportunities for more direct integration of the physical world into computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each thing is uniquely identifiable through its embedded computing system, but is able to interoperate within the existing Internet infrastructure. Thus, for example, the tracking device may be configured to communicate with an appliance or an automobile in order to keep track of the object. In such an embodiment, the IoT device can inform the user if the object leaves the area or if another person or object enters the area. The IoT device can also forward communications from the tracking device to the mobile device of the user.

In embodiments, the tracking device can include a NFC device. In such embodiments, multiple monitoring devices or "listening devices" can monitor or look for the tracking device and inform an IoT device or mobile device of the user when the tracking device is located. For example, if a child wearing the tracking device is reported missing or leaves an area in which the child was supposed to remain, an alert can be placed out to various monitoring devices to watch for and monitor for the presence of the tracking device. For example, a child may go missing in the Portland, Oreg., area and monitoring devices such as, for example, automobiles, appliances, and other IoT devices can monitor the area for detection of the presence of the tracking device. If one of the monitoring devices detects the presence of the tracking device, the monitoring device can alert the authorities, alert the mobile device or IoT device of the user, etc.

Similarly, a "neighborhood watch" can be defined within a geographical area. In such an example, monitoring devices such as, for example, IoT devices, mobile devices, etc., can monitor the presence of tracking devices within the neighborhood watch area that has been defined. If one of the tracking devices leaves the neighborhood watch area, then appropriate authorities and/or users can be notified by the monitoring devices communicating with other devices.

In embodiments, objects such as mobile devices, appliances, and other items, can have a tracking device such as, for example, a NFC device attached thereto. The objects can then be monitored by monitoring devices in order to ensure that they are located within the area in which they are supposed to be. Alternatively, if a user discovers that one of their objects that has been outfitted with a NFC device has gone missing, then the user can notify an operator of the wireless communication network in which the remote location management arrangement is operated in order for the operator to have monitoring devices be on the lookout for the missing object.

In embodiments, a user may define the geographical area in which the user wishes for objects with a tracking device to remain. The user can define the area utilizing a map on the user's mobile device in order to define a geo-fence. Alternatively, the user can define the geo-fence by walking the boundary areas of the geographical area. GPS can then be utilized to monitor the tracking device and alert the user when the tracking device has left the defined geographical area.

FIG. 1 illustrates a wireless communication network 100 (also referred to herein as network 100). The network 100 comprises a base station (BS) 102 communicatively coupled to a plurality of user devices, referred to as UEs 104_1, 104_2, . . . , 104_N, where N is an appropriate integer. The BS 102 serves UEs 104 located within a geographical area, e.g., within a macro cell 106. FIG. 1 illustrates the macro cell 106 to be hexagonal in shape, although other shapes of the macro cell 106 may also be possible. In general, the network 100 comprises a plurality of macro cells 106, with each macro cell 106 including one or more BSs 102.

In an embodiment, the UEs 104_1, . . . , 104_N may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, integrated devices combining one or more of the preceding devices, and/or the like. As such, UEs 104_1, . . . , 104_N may range widely in terms of capabilities and features. For example, one of the UEs 104_1, . . . , 104_N may have a numeric keypad, a capability to display only a few lines of text and be configured to interoperate with only Global System for Mobile Communications (GSM) networks. However, another of the UEs 104_1, . . . , 104_N (e.g., a smart phone) may have a touch-sensitive screen, a stylus, an embedded GPS receiver, and a relatively high-resolution display, and be configured to interoperate with multiple types of networks. UEs 104_1, . . . , 104_N may also include SIM-less devices (i.e., mobile devices that do not contain a functional subscriber identity module ("SIM")), roaming mobile devices (i.e., mobile devices operating outside of their home access networks), and/or mobile software applications.

In an embodiment, the BS 102 may communicate voice traffic and/or data traffic with one or more of the UEs 104_1, . . . , 104_N. The BS 102 may communicate with the UEs 104_1, . . . , 104_N using one or more appropriate wireless communication protocols or standards. For example, the BS 102 may communicate with the UEs 104_1, . . . , 104_N using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 102 may be communicatively coupled (e.g., using a backhaul connection, illustrated using solid lines in FIG. 1) to a number of backhaul equipment, e.g., an operation support subsystem (OSS) server 108, a radio network controller (RNC) 110, and/or the like. The RNC 110 can also be in the form of a mobility management entity when the wireless communication network 100 operates according to the long term evolution (LTE) standard or LTE Advanced standard.

In an embodiment, the base station 102 may comprise processors 120, one or more transmit antennas (transmitters) 122, one or more receive antennas (receivers) 124, and computer-readable media 126. The processors 120 may be configured to execute instructions, which may be stored in the computer-readable media 126 or in other computer-readable media accessible to the processors 120. In some embodiments, the processors 120 are a central processing unit (CPU), a graphics processing unit (GPU), or both CPU and GPU, or any other sort of processing unit. The base station 102 can also be in the form of a Node B (where the wireless communication network 100 is 3G UMTS network) or in the form of an eNode B (where the wireless communication network 100 operates according to the LTE standard or LTE Advanced standard).

The one or more transmit antennas 122 may transmit signals to the UEs 104_1, . . . , 104_N, and the one or more receive antennas 124 may receive signals from the UEs 104_1, . . . , 104_N. The antennas 122 and 124 include any appropriate antennas known in the art. For example, antennas 122 and 124 may include radio transmitters and radio receivers that perform the function of transmitting and receiving radio frequency communications. In an embodiment, the antennas 122 and 124 may be included in a transceiver module of the BS 102.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store modules, such as instructions, data stores, and so forth that are configured to execute on the processors 120. For instance, the computer-readable media 126 may store an access point control module 128 and a network settings module 130, as will be discussed in more detail herein later.

Although FIG. 1 illustrates the computer-readable media 126 in the BS 102 storing the access point control module 128 and the network settings module 130, in various other embodiments, the access point control module 128, the network settings module 130, and one or more other modules (not illustrated, may be stored in another component of the network 100 (e.g., other than the BS 102). For example, one or more of these modules may be stored in a computer-readable media included in the OSS server 108, the RNC 110, another appropriate server associated with the network 10, and/or the like.

Although not illustrated in FIG. 1, various other modules (e.g., an operating system module, basic input/output systems (BIOS), etc.) may also be stored in the computer-readable media 126. Furthermore, although not illustrated in FIG. 1, the base station 102 may comprise several other components, e.g., a power bus configured to supply power to various components of the base station 102, one or more interfaces to communicate with various backhaul equipment, and/or the like.

In an embodiment, the UEs 104 may comprise processors 140, one or more transmit antennas (transmitters) 142, one or more receive antennas (receivers) 144, and computer-readable media 146. The processors 140 may be configured to execute instructions, which may be stored in the computer-readable media 146 or in other computer-readable media accessible to the processors 140. In some embodiments, the processors 140 is a central processing unit (CPU), a graphics processing unit (GPU), or both CPU and GPU, or any other sort of processing unit. The one or more transmit antennas 142 may transmit signals to the base station 102, and the one or more receive antennas 144 may receive signals from the base station 102. In an embodiment, the antennas 142 and 144 may be included in a transceiver module of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 14.

The computer-readable media 146 may store several modules, such as instructions, data stores, and so forth that are configured to execute on the processors 140. For instance, the computer-readable media 140 may store a configuration module 148. Although not illustrated in FIG. 1, the computer-readable media 146 may also store one or more applications configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 102, other UEs, etc.).

Although not illustrated in FIG. 1, the UEs 104 may also comprise various other components, e.g., a battery, a charging unit, one or more network interfaces, an audio interface, a display, a keypad or keyboard, a GPS receiver and/or other location determination component, and other input and/or output interfaces.

Although FIG. 1 illustrates only one UE (UE 104_1) in detail, each of the UEs 104_2, . . . , 104_N may have a structure that is at least in part similar to that of the UE 104_1. For example, similar to the UE 104_1, each of the UEs 104_2, . . . , 104_N may comprise processors, one or more transmit antennas, one or more receive antennas, and computer-readable media including a configuration module.

In an embodiment, the network settings module 130 stored in the computer-readable media 126 maintains a plurality of network settings associated with the network 10. Individual network settings maintained by the network settings module 130 may be pertinent to a single UE of the UEs 104_1, . . . , 104_N, a subset of the UEs 104_1, . . . , 104_N, or each of the UEs 104_1, . . . , 104_N. For example, a network setting of the plurality of network settings may specify a maximum bit rate at which a UE (or each of the UEs 104_1, . . . , 104_N) may transmit data to the BS 102. Another network setting of the plurality of network settings may specify a transmit time interval (tti) used by each of the UEs 104_1, . . . , 104_N to transmit data to the BS 102. Yet another network setting of the plurality of network settings may specify a maximum power that each of the UEs 104_1, . . . , 104_N may use to transmit data to the BS 102. The plurality of network settings maintained by the network settings module 130 may also include any other appropriate type of network settings.

In an embodiment, one or more of the plurality of network settings maintained by the network settings module 130 may be communicated to the UEs 104_1, . . . , 104_N (e.g., by the transmit antennas 122 to the receive antennas 144 of the UEs 104_1, . . . , 104_N). Based on receiving the network settings, the UEs 104_1, . . . , 104_N (e.g., the corresponding configuration modules 148) may configure themselves and communicate with the BS 102 accordingly.

In accordance with embodiments, the wireless communication network 100 includes one or more remote location management systems or arrangements 150. The remote location management arrangement 150 may be used to monitor and/or determine location of objects within the remote location management arrangement 150 and/or other parts of the wireless communication network 10, as will be described further herein.

Figure 2:
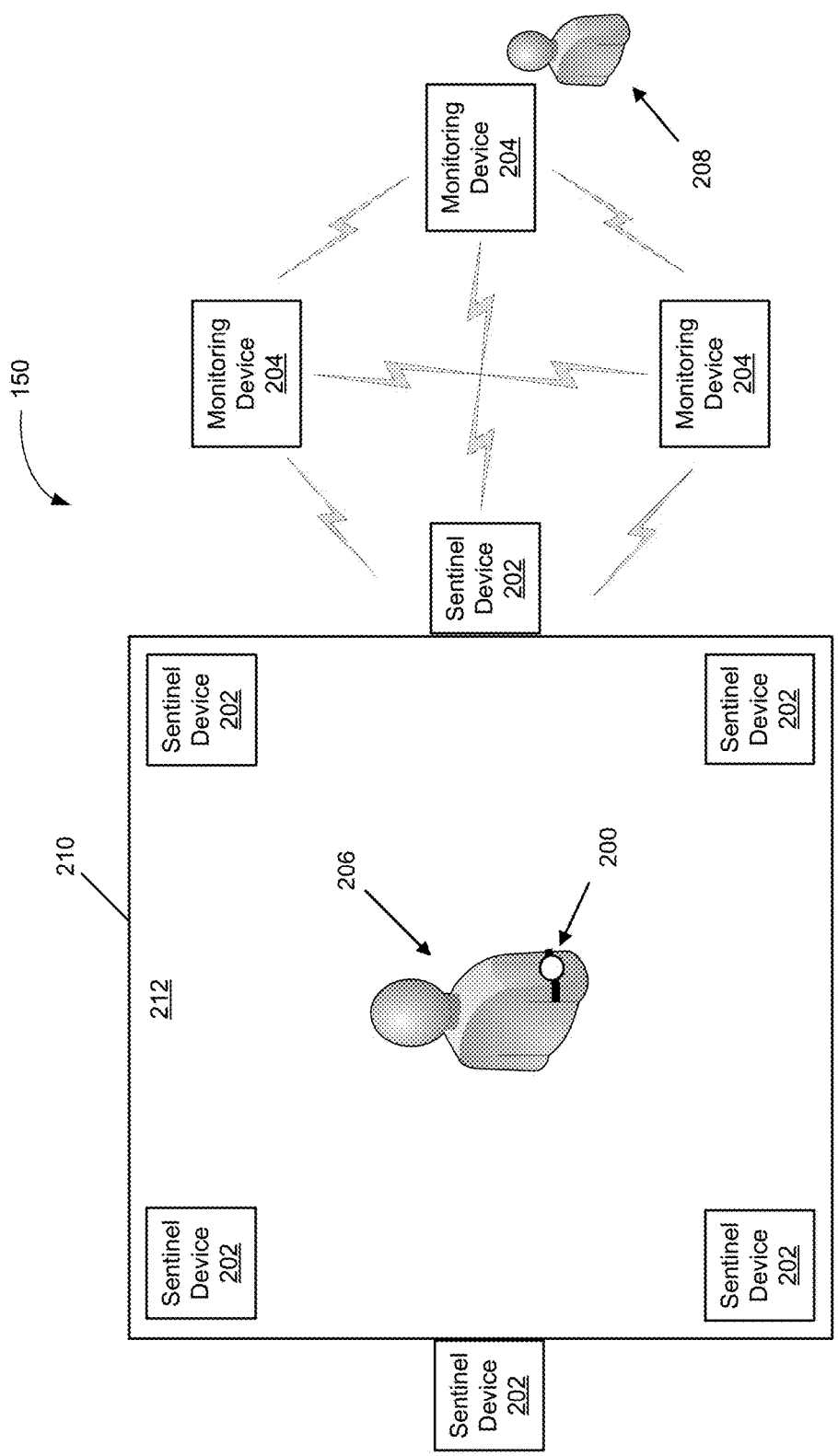
FIG. 2 illustrates a remote location management arrangement within the wireless communication network of FIG. 1, in accordance with various embodiments.

FIG. 2 schematically illustrates the remote location management system or arrangement 150 arranged within the wireless communication network 100. The remote location management arrangement 150 includes one or more tracking devices 200, one or more sentinel devices 202 and one or more monitoring devices 204. Each tracking device 200 can be secured to an object 206 that a user 208 within the wireless communication network 100 wishes to keep track of. In embodiments, the tracking device 200 comprises a bracelet or collar that can be placed around a person's wrist, ankle or neck, if the object 206 is a person. Likewise, the tracking device 200 can comprise a collar or bracelet that can be placed around a pet's neck or ankle if the object 206 to be tracked is a pet. Other tracking devices 200 can be used such as, for example, hats, rings or other jewelry, articles of clothing, watches, a mobile device, etc. The list of possible tracking devices 200 lists examples and is not meant to be limiting.

As an example, the object 206 may be a child and the tracking device may comprise a wrist-band. The wrist-band may contain a camera with magnification that periodically take pictures of the child's skin color, skin texture and vein pattern underneath the wrist-band to ensure the identity of the child.

In embodiments, the tracking device 200 comprises a portable electronic device or an Internet of Things (IoT) device. The monitoring devices 204 may comprise portable electronic devices and/or IoT devices. The portable electronic devices and IoT devices generally correspond to the UEs 104 of the wireless communication network 100. The portable electronic devices and IoT devices can communicate with each other via, for example, the wireless communication network 100, the Internet and other methods such as, for example, a wireless local area network (WLAN).

The tracking device 200 includes a transmitter that communicates with at least one monitoring device 204, e.g., a mobile device of the user 208. In embodiments, the tracking device 200 comprises a transceiver to allow two-way communication with the monitoring device 204. Thus, the tracking device can inform the monitoring device 204 if the tracking device is removed from the object 206. In embodiments, the tracking device and monitoring device can communicate via, for example, at least one of voice, short message service (SMS) messages, multimedia messaging service (MMS) messages, instant messaging (IM) messages, enhanced message service (EMS) messages or e-mail messages.

The user 208 can establish boundaries 210 to define a boundary area or region 212 within which the user 208 wishes for the object 206 to remain. The boundaries 210 can be marked with the sentinel devices 202 in the form of, for example, near field communication (NFC) devices, cameras, microphones, etc. For example, the sentinel devices 202 may comprise NFC devices that can be placed around or at the boundaries 210, or within the boundaries 210, i.e. within the boundary area 212. The NFC devices can be mounted on or attached to various objects such as, for example, stakes, trees, buildings, appliances, fences, etc. The user 208 can register the NFC devices such that the tracking device 200 can interact and communicate with the NFC devices. If the tracking device 200 loses communication with the NFC devices, then the tracking device 200 can inform the user's monitoring device 204, thereby alerting the user 208 that the object 206 has left the boundary area 212. Likewise, the sentinel devices can be arranged and configured to notify the monitoring device 204 of the user 204 if another object, such as a person or an animal, has entered the boundary area 212.

In embodiments, the NFC devices comprise stickers that include thin film circuitry, as is known. The sentinel devices 202 and/or monitoring devices 204 are generally configured to communicate with the wireless communication network 100 via various technologies such as, for example, Bluetooth, Wi-Fi, etc.

In embodiments, a user 208 may define the boundary area 212 in which the user 208 wishes for objects 206 with a tracking device 200 to remain. The user 208 can define the area utilizing a map on the user's mobile device in order to define a geo-fence. Alternatively, the user 208 can define the geo-fence by walking the boundaries 210 of the boundary area 212 and marking the boundaries 210 with their mobile device. GPS can then be utilized to monitor the tracking device(s) 200 and alert the user 208 when a tracking device 200 has left the defined boundary area 212.

In embodiments, the tracking device 200 can communicate with multiple monitoring devices 204. For example, the tracking device 200 may be configured to communicate with monitoring devices 204 such as, for example, IoT devices in the form of an appliance or an automobile in order to keep track of the object 206. In such an embodiment, the IoT device can inform the user 208 if the object 206 leaves the area or if another person or object enters the area. The IoT device can also forward communications from the tracking device 200 to a mobile device of the user 208. In addition, monitoring devices 204 can communicate with multiple tracking devices 200.

In embodiments, the tracking device 200 can include a NFC device. In such embodiments, multiple monitoring devices 204 can act as "listening devices" that can monitor or look for the tracking device 200 within a defined geographical area 212 and inform an IoT device or mobile device of the user 208 when the tracking device 200 is located. For example, if a child wearing the tracking device 200 is reported missing or leaves an area in which the child was supposed to remain, an alert can be placed out to various monitoring devices 204 to watch for and monitor for the presence of the tracking device 200. For example, a child may go missing in a geographical area such as, for example, the Portland, Oreg. area (defined boundary area 212), and monitoring devices 204 such as, for example, automobiles, appliances, and other IoT devices, as well as mobile devices, can monitor the Portland, Oreg. area for detection of the presence of the tracking device 200. If one of the monitoring devices 204 detects the presence of the tracking device 200, the monitoring device 204 can alert the authorities, alert a mobile device or IoT device of the user 208, etc.

In a similar example, a "neighborhood watch" can be defined within a geographical area, e.g., the boundary area 212. In such an example, monitoring devices 204 such as, for example, IoT devices, mobile devices, etc., can monitor the presence of tracking devices 200 within the neighborhood watch area 212 that has been defined. If one of the tracking devices 200 leaves the neighborhood watch area 212, then appropriate authorities and/or users can be notified by one or more of the monitoring devices 204.

For participating in such monitoring arrangements, users 208 within the wireless communication network 100 can opt in with an operator of the wireless communication network 100. When such monitoring devices 204 need to be on the alert for a particular tracking device 200, a push notification can be provided to the monitoring devices 204 that have opted in. Alternatively, a passive arrangement can be provided where the monitoring devices 204 may pick up that a tracking device 200 is nearby and alert the appropriate authorities or users.

In embodiments, objects 206 such as mobile devices, appliances, and other items, can have a tracking device 200 such as, for example, a NFC device attached thereto. The objects can then be monitored by monitoring devices 204 in order to ensure that they are located within the boundary area 212 in which they are supposed to be. Alternatively, if a user 208 discovers that one of their objects that has been outfitted with a NFC device has gone missing, then the user 208 can notify an operator of the wireless communication network 100 in order for the operator to have monitoring devices 204 be on the lookout for the missing object.

As an example, a user 208 places a tracking device 200 in the form of an IoT wrist-band on his or her child. The IoT wrist-band contains a camera with magnification that periodically take pictures of the child's skin color, skin texture and vein pattern underneath the wrist-band to ensure the identity of the child. The user 208 can then establish a geo-fence around the child by using his or her mobile device (serving as a monitoring device 204) and walks around the child marking the coordinates of the geo-fence border, e.g., boundary area 212. Lastly, one or more sentinel devices 202 with various sensors (e.g., camera, video, microphones, radar and NFC devices) is placed at or within the geo-fence. If a person or animal enters the geo-fence, the one or more sentinel devices 202 trigger capture of a sensor and interrogates the IoT wrist-band alerting (or making an audible alert on the sentinel device 202) to the mobile device of the user 208 (or s group of mobile devices or IoT devices). Upon notification, the user 208 can determine friend or foe and take action. Likewise, if the child leaves the geo-fence, the one or more sentinel devices 202 trigger capture of a sensor and interrogates the IoT wrist-band alerting (or making an audible alert on the sentinel device 202) to the mobile device of the user 208 (or s group of mobile devices or IoT devices). Finally, if the tracking device 200 is removed from the child, the tracking device 200 alerts the mobile device of the user 208 (or s group of mobile devices or IoT devices).

Thus, the various embodiments and arrangements disclosed herein can be utilized to monitor and/or track the location of various objects such as, for example, people, pets, electronic devices, appliances, cars, etc.

Figure 3:
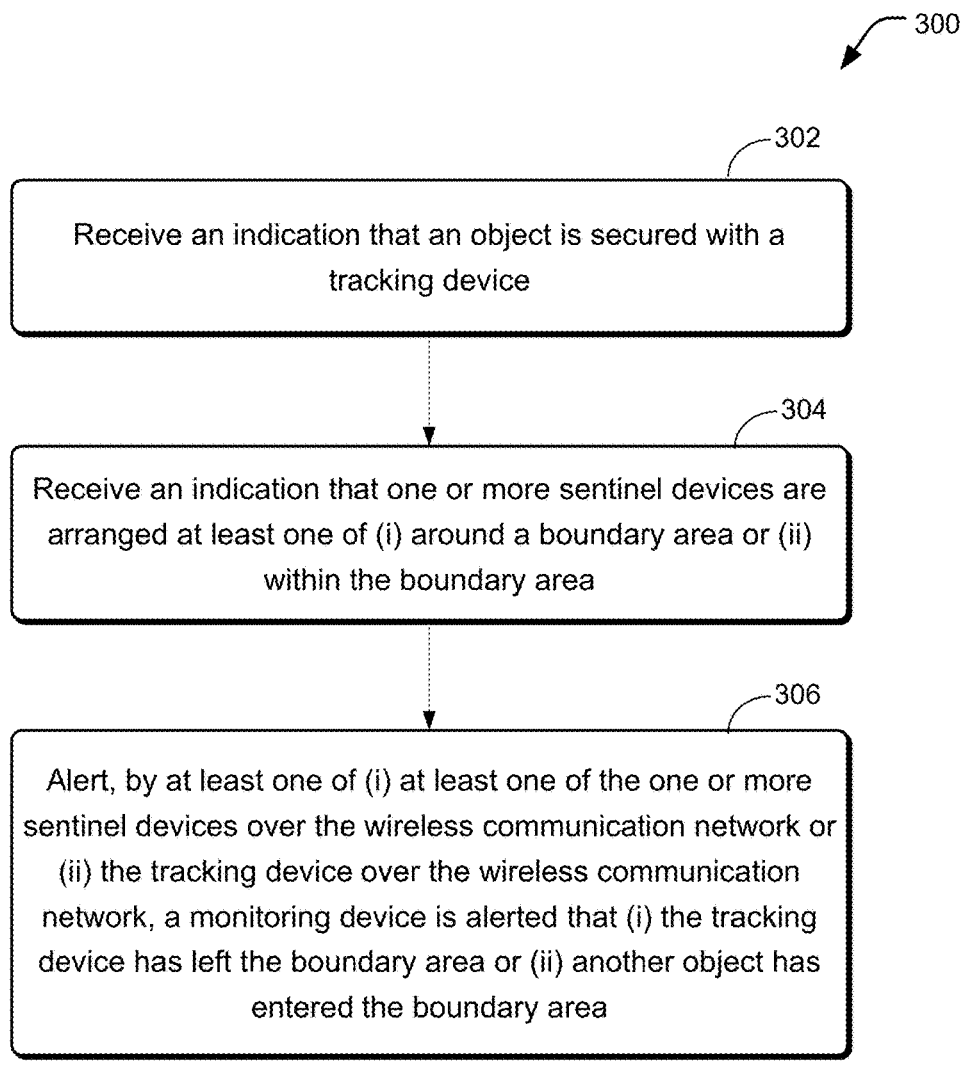
FIG. 3 is a flowchart illustrating an example method of monitoring a remote location of an object within the wireless communication network of FIG. 1, in accordance with various embodiments.

FIG. 3 is a flowchart illustrating a method 300 of monitoring a remote location of an object within a wireless communication network, e.g., wireless communication network 100. As illustrated, at block 302, the object is secured with a tracking device. At block 304, a boundary area is defined within which a user wishes the object to remain. At block 306, one or more sentinel devices are arranged at least one of (i) around the boundary area or (ii) within the boundary area. At block 308, a monitoring device is alerted by at least one of (i) at least one of the one or more sentinel devices over the wireless communication network or (ii) the tracking device over the wireless communication network that (i) the tracking device has left the boundary area or (ii) another object has entered the boundary area.

Figure 4:
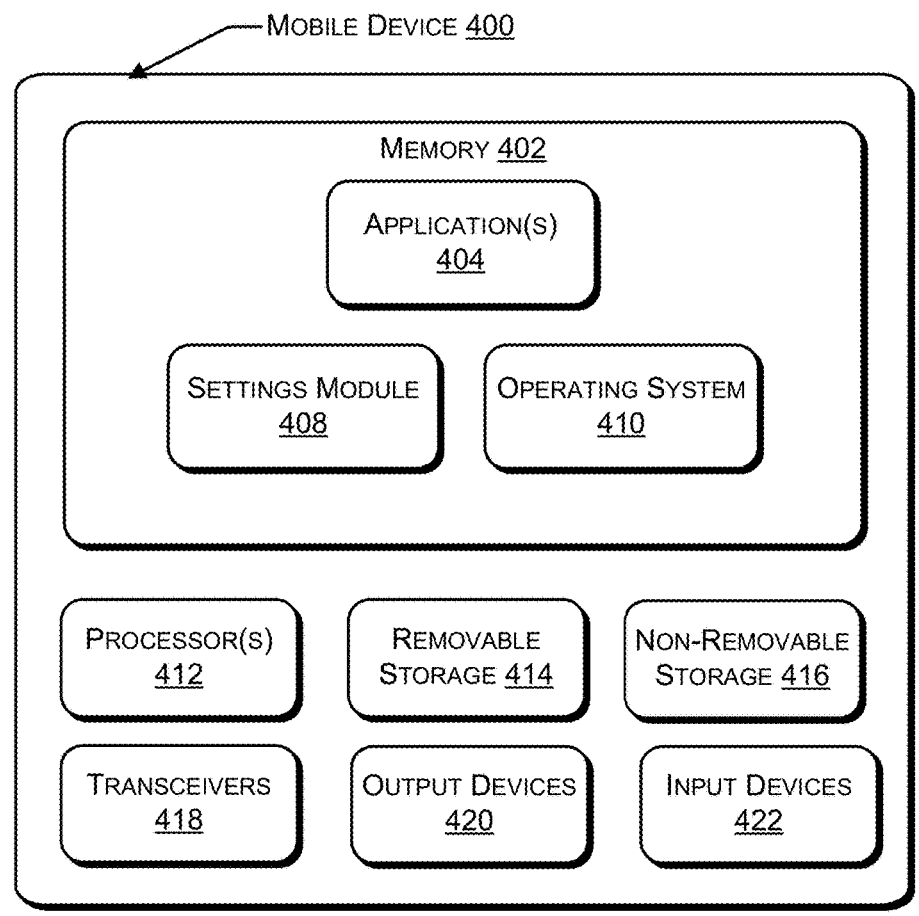
FIG. 4 illustrates a component level view of an example mobile device configured for use in the wireless communication network of FIG. 1 and the remote location management arrangement of FIG. 2.

FIG. 4 illustrates a component level view of a mobile device 400, such as UE 104, configured to function as a monitoring device 204 as described herein and communicate with sentinel devices 202 and/or other monitoring devices 204. As illustrated, the mobile device 400 comprises a system memory 402 storing application(s) 404, a settings module 408, and an operating system 410. Also, the mobile device 400 includes processor(s) 412, a removable storage 414, a non-removable storage 416, transceivers 418, output device(s) 420, and input device(s) 422. In various implementations, system memory 402 is volatile (such as RAM), non-volatile (such as ROM, flash memory, etc.) or some combination of the two. In some implementations, the processor(s) 412 is a central processing unit (CPU), a graphics processing unit (GPU), or both CPU and GPU, or any other sort of processing unit.

The mobile device 400 may also include additional data storage devices (removable and/or non-removable) such as, for example, magnetic disks, optical disks, or tape. Such additional data storage may include removable storage 414 and non-removable storage 416.

Non-transitory computer-readable media may include volatile and nonvolatile, removable and non-removable tangible, physical media implemented in technology for storage of information, such as computer readable instructions, data structures, program modules, or other data. System memory 402, removable storage 414 and non-removable storage 416 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 400. Any such non-transitory computer-readable media may be part of the user device 400.

In some implementations, the transceivers 418 include any sort of transceivers known in the art. For example, the transceivers 418 may include a radio transceiver that performs the function of transmitting and receiving radio frequency communications via an antenna. Also or instead, the transceivers 418 may include wireless modem(s) to may facilitate wireless connectivity with other computing devices. Further, the transceivers 418 may include wired communication components, such as an Ethernet port, for communicating with other networked devices.

In some implementations, the output devices 420 include any sort of output devices known in the art, such as a display (e.g., a liquid crystal display), speakers, a vibrating mechanism, or a tactile feedback mechanism. Output devices 420 also include ports for one or more peripheral devices, such as headphones, peripheral speakers, or a peripheral display.

In various implementations, input devices 422 include any sort of input devices known in the art. For example, input devices 422 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method of monitoring a remote location of an object within a wireless communication network, the method comprising:

receiving a first indication that the object is secured with a tracking device that is configured to determine that the tracking device is secured to the object based on a camera of the tracking device capturing at least one of a skin color, a skin texture, or a vein pattern;

receiving, at a first monitoring device, data defining a boundary area;

receiving a second indication that one or more sentinel devices that are in communication with the tracking device are arranged at least one of (i) around the boundary area or (ii) within the boundary area;

alerting, by at least one of (i) at least one of the one or more sentinel devices over the wireless communication network or (ii) the tracking device over the wireless communication network, the first monitoring device that (i) the tracking device has left the boundary area in response to receiving a third indication that the tracking device has left the boundary area or (ii) another object has entered the boundary area;

in response to alerting, by at least one of (i) the at least one of the one or more sentinel devices over the wireless communication network or (ii) the tracking device over the wireless communication network, the first monitoring device that the tracking device has left the boundary area, alerting a second monitoring device that is located outside the boundary area to monitor for the tracking device; and alerting the first monitoring device that the second monitoring device has located the tracking device.

2. The method of claim 1, wherein receiving the second indication that one or more sentinel devices are arranged comprises receiving data indicating that one or more cameras, one or more microphones, and/or one or more near field communication (NFC) devices are arranged at least one of (i) around the boundary area or (ii) within the boundary area.

3. The method of claim 1, further comprising:

receiving the second indication that one or more sentinel devices are arranged comprises receiving data indicating that one or more NFC devices are arranged at least one of (i) around the boundary area or (ii) within the boundary area; and alerting, by at least one of (i) the at least one of the one or more sentinel devices over the wireless communication network or (ii) the tracking device over the wireless communication network, the first monitoring device that the tracking device has left the boundary area comprises alerting the first monitoring device, by the tracking device, that the tracking device is no longer in contact with the one or more NFC devices.

4. The method of claim 1, wherein alerting, by at least one of (i) the at least one of the one or more sentinel devices over the wireless communication network or (ii) the tracking device over the wireless communication network, the first monitoring device that the tracking device has left the boundary area comprises alerting the first monitoring device via at least one of a short message service (SMS) message, a multimedia messaging service (MMS) message or a voice message.

5. The method of claim 1, wherein:
defining the boundary area comprises defining a geographical region with the first monitoring device as the boundary area;
receiving the second indication that one or more sentinel devices are arranged comprises receiving data indicating that a plurality of sentinel devices are arranged within the geographical region; and
alerting, by at least one of (i) the at least one of the one or more sentinel devices over the wireless communication network or (ii) the tracking device over the wireless communication network, the first monitoring device that the tracking device has left the boundary area comprises alerting, by one of the plurality of sentinel devices within the geographical region, the first monitoring device that the tracking device has left the geographical region.

6. The method of claim 1, further comprising alerting the first monitoring device when the tracking device is removed from the object.

7. The method of claim 1, further comprising:
in response to alerting, by at least one of (i) the at least one of the one or more sentinel devices over the wireless communication network or (ii) the tracking device over the wireless communication network, the first monitoring device that the tracking device has left the boundary area, receiving a fourth indication that a plurality of sentinel devices are activated within a geographical region; and
alerting, by one of the plurality of sentinel devices within the geographical region, the first monitoring device that the tracking device has been detected by the one of the plurality of sentinel devices within the geographical region.

8. The method of claim 1, further comprising communicating, by the first monitoring device, with the tracking device.

9. The method of claim 8, wherein communicating, by the first monitoring device, with the tracking device comprises communicating via at least one of voice, a short message service (SMS) message, a multimedia messaging service (MMS) message, an instant messaging (IM) message, an enhanced message service (EMS) message or an e-mail message.

10. A remote location monitoring arrangement within a wireless communication network, the monitoring arrangement comprising:

a tracking device for securing to an object, the tracking device being configured to determine that the tracking device is secured to the object based on a camera of the tracking device capturing at least one of a skin color, a skin texture, or a vein pattern;

one or more sentinel devices arranged within at least one of (i) around a boundary area or (ii) within the boundary area, wherein the boundary area is an area in which a user wishes the object to remain; and a monitoring device configured to define the boundary area by the user and in communication with at least one of (i) the one or more sentinel devices or (ii) the tracking device such that at least one of (i) at least one of the one or more sentinel devices or (ii) the tracking device alerts the monitoring device over the wireless communication network that (i) the tracking device has left the boundary area or (ii) another object has entered the boundary area.

11. The remote location monitoring arrangement within the wireless communication network of claim 10, wherein the one or more sentinel devices comprises one or more cameras, one or more microphones, and one or more near field communication (NFC) devices at least one of (i) around the boundary area or (ii) within the boundary area.

12. The remote location monitoring arrangement within the wireless communication network of claim 10, wherein:
the one or more sentinel devices comprises one or more NFC devices; and
the tracking device alerts the monitoring device when the tracking device is no longer in contact with any of the NFC devices.

13. The remote location monitoring arrangement within the wireless communication network of claim 10, wherein the boundary area comprises a geo-fence.

14. The remote location monitoring arrangement within the wireless communication network of claim 10, wherein the monitoring device comprises a mobile electronic device.

15. The remote location monitoring arrangement within the wireless communication network of claim 10, wherein the monitoring device comprises an Internet of Things (loT) device.

16. The remote location monitoring arrangement within the wireless communication network of claim 10, wherein the monitoring device is a first monitoring device and the first monitoring device transmits an alert to a second monitoring device indicating that the tracking device has left the boundary area.

17. The remote location monitoring arrangement within the wireless communication network of claim 10, further the tracking device alerts the monitoring device over the wireless communication network when the tracking device is removed from the object.

18. The remote location monitoring arrangement within the wireless communication network of claim 10, wherein the object comprises one of (i) a person, (ii) an animal or (iii) an electronic device.

19. A remote location monitoring arrangement within a wireless communication network, the monitoring arrangement comprising:

a tracking device for securing to an object the tracking device being configured to determine that the tracking device is secured to the object based on a camera of the tracking device capturing at least one of a skin color, a skin texture, or a vein pattern;

one or more sentinel devices arranged within at least one of (i) around a boundary area or (ii) within the boundary area; and a monitoring device configured to define the boundary area by a user and in communication with at least one of (i) the one or more sentinel devices or (ii) the tracking device such that at least one of (i) the one or more sentinel devices or (ii) the tracking device alerts the monitoring device over the wireless communication network that another object has entered the boundary area.

20. The method of claim 1, wherein the tracking device comprises at least one of a collar, a bracelet, a hat, a ring, an article of clothing, a watch, or a mobile device.

* * * * *